United States Patent [19]

Gelinas

[11] Patent Number: 4,840,278
[45] Date of Patent: Jun. 20, 1989

[54] CEILING RACK

[76] Inventor: Yvon Gelinas, 31 Stéphane, P.O. Box 52, St. Philippe, Quebec, Canada, J0L 2K0

[21] Appl. No.: 195,309
[22] Filed: May 17, 1988
[51] Int. Cl.⁴ .................................................. A47F 7/00
[52] U.S. Cl. ........................................ 211/18; 211/20; 211/118
[58] Field of Search ........................ 211/18, 17, 20, 21, 211/117, 118; 248/333

[56] References Cited

U.S. PATENT DOCUMENTS

| | | | |
|---|---|---|---|
| 557,567 | 4/1896 | Eddy | 211/118 X |
| 579,584 | 5/1897 | Jessup . | |
| 618,999 | 2/1899 | Sayer | 211/17 |
| 3,782,559 | 1/1974 | Wright | 211/17 |
| 3,994,425 | 11/1976 | Graber | 211/17 X |
| 4,127,252 | 11/1978 | Splawn | 248/333 |
| 4,343,404 | 8/1982 | Folsom . | |
| 4,555,029 | 11/1985 | Fiol . | |

*Primary Examiner*—Alvin C. Chin-Shue
*Assistant Examiner*—Sarah Lechok Eley
*Attorney, Agent, or Firm*—Edwin E. Greigg

[57] ABSTRACT

A ceiling rack which comprises a preferably T-shaped attachment member carrying usually one or more pairs of elongated support members is useful for the uncluttered storage of a variety of articles which hang from the rack in an easily removable way. The attachment member has a horizontal bar which attaches to the ceiling and has a downwardly projecting vertical stem mounted telescopically to (and preferably outside) a height adjusting member. To the lower end of this height adjusting member is attached a frame to which is removably attached at least one elongated horizontal support member. Plural support members are preferably parallel to each other and when a pair of support members is chosen, each of the pair is equidistant from the height adjusting member although not necessarily in the same horizontal plane as the lower end of the height adjusting member. The support members each have a longitudinal channel along their upward sides giving each support member a retaining facility for such items as bicycle crossbars.

9 Claims, 2 Drawing Sheets

CEILING RACK

FIELD OF THE INVENTION

The present invention relates to a ceiling rack useful for uncluttered storage of a variety of articles, particularly bicycles, which hang from the rack in an easily removable way.

DESCRIPTION OF THE PRIOR ART

The idea of storing bicycles suspended from a ceiling is well known. For instance U.S. Pat. No. 557,567 discloses a dual hook system, each hook being fastened to the ceiling.

U.S. Pat. No. 579,584 discloses another dual hook device, the hooks being disposed on opposite ends of a horizontally suspended plate member so that one hook retains the crossbar of the bicycle and the other hook the saddle.

U.S. Pat. No. 3,782,559 discloses a vertically suspended plate carrying two J-shaped hangers able to retain the cross-bar of a man's bicycle. The hangers are laterally adjustable. The plate is removable from freely hanging hooks sunk into the ceiling. Vertical height is adjustable.

U.S. Pat. No. 4,343,404 discloses a suspension rack attachable to a door or wall. The rack provides two J-clips to support the bicycle.

U.S. Pat. No. 4,555,029 discloses a retail bicycle display unit enabling several bicycles to be presented in tiers. The wheels are supported by U-shaped elements.

None of the foregoing references discloses a rigid support frame attachable to the ceiling and yet vertically adjustable.

OBJECTS OF THE INVENTION

An object of the present invention is therefore to provide a ceiling rack for supporting a variety of goods, particularly bicycles, where the rack is rigidly affixed to the ceiling and yet its height is adjustable.

It is also an object to provide a rigid ceiling support for any article having a horizontally supportable bar portion such as the handle of a lawnmover, or the shape such as a golf-bag.

A further object is to provide rigid ceiling supports for planks to create shelving.

Another object is to provide such a rack made up of modular elements for variable construction design and ease of packaging.

SUMMARY OF THE INVENTION

In meeting the above and other objects, the present invention provides a ceiling rack which comprises a preferably T-shaped attachment member whose horizontal bar attaches to the ceiling and whose projecting vertical stem is mounted telescopically to (and preferably outside) a height adjusting member. To the lower end of this height adjusting member is attached a frame to which is removeably attached at least one elongated horizontal support member. Plural support members are preferably parallel to each other and when a pair of support members is chosen, each of the pair is preferably equidistant from the height adjusting member although not necessarily in the same horizontal plane as the lower end of the height adjusting member. The support members each have a longitudinal channel along their upward sides giving each support member a retaining facility for such items as bicycle crossbars.

The ceiling rack according to the invention has the particular advantage that it can be produced as constituent parts which may be rigidly constructed where installation is desired. This facet affords portability as well as simplifying packaging difficulties.

BRIEF DESCRIPTION OF THE DRAWINGS

The foregoing and other advantages of the present invention will be apparent from the following drawings in which.

PREFERRED EMBODIMENTS OF DETAILED DESCRIPTION

Figure 1:
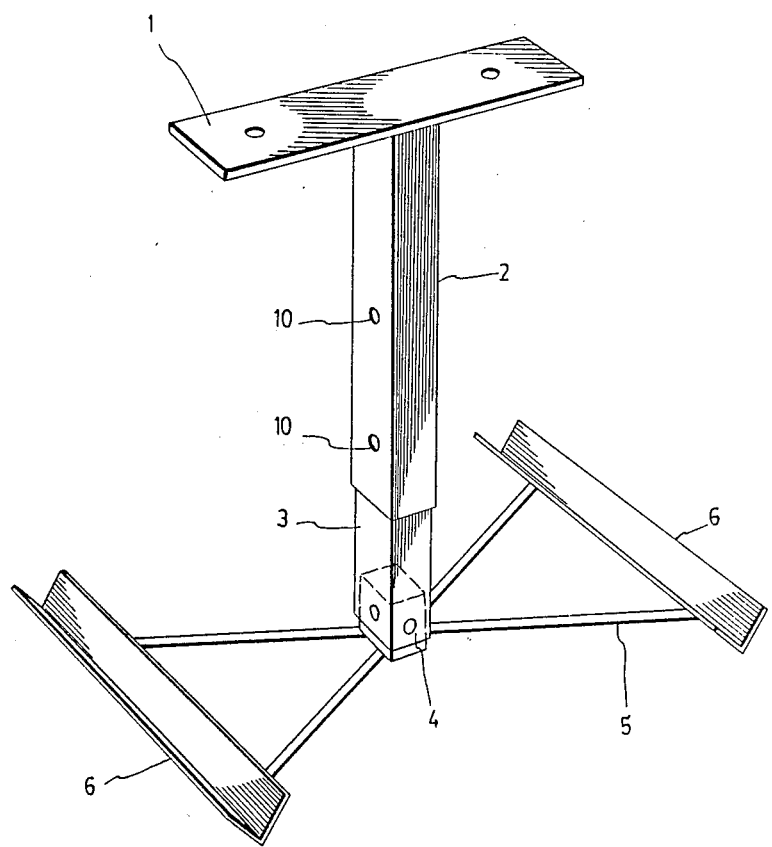
FIG. 1 is a perspective view of one embodiment of the invention.

Referring to FIG. 1, the attachment member is T-shaped and comprises a horizontal planar bar (1) and a vertical stem (2) which is a hollow, cross-sectionally square tube (2). The interior dimensions of this tube (2) are just slightly larger than the exterior dimensions of the (also cross-sectionally square) height adjusting member (3). Thus the height adjusting member (3) fits telescopically inside the stem tube (2) and may be fixed therein in one of several vertical settings by suitable cooperating retaining or locking means (not shown) such as a pin passing through aligned holes (10) in the stem tube (2) and the height adjusting member (3).

In FIG. 1, the abovementioned frame is embodied partly in a boss (4) of cuboid shape which fits into a corresponding cuboid recess in the lower end of the height adjusting member (2). A pair of cross-sectionally V-shaped support members (6) are disposed equidistantly from the boss (4) by further components of the frame, namely four struts (5) which form an X-shaped arrangement. Each strut (5) is attached to the boss (4) at one end and at the other end towards one end of a respective support member (6).

The V-shaped support members are preferably 45° angle irons although they may generally be of any channel design such as cross-sectionally U-shaped, preferably flat-bottomed U-shape with outwardly tapering sides.

The boss (4) is retained in the lower end of the height adjusting member by any suitable retaining means such as mentioned above. Alternatively the boss (4) may be omitted entirely with the support members (6) being attached instead directly to the lower end of the height adjusting member (3). However inclusion of the boss is preferred since it allows constituent parts of the rack to be collapsed into a smaller volume.

Figure 2:
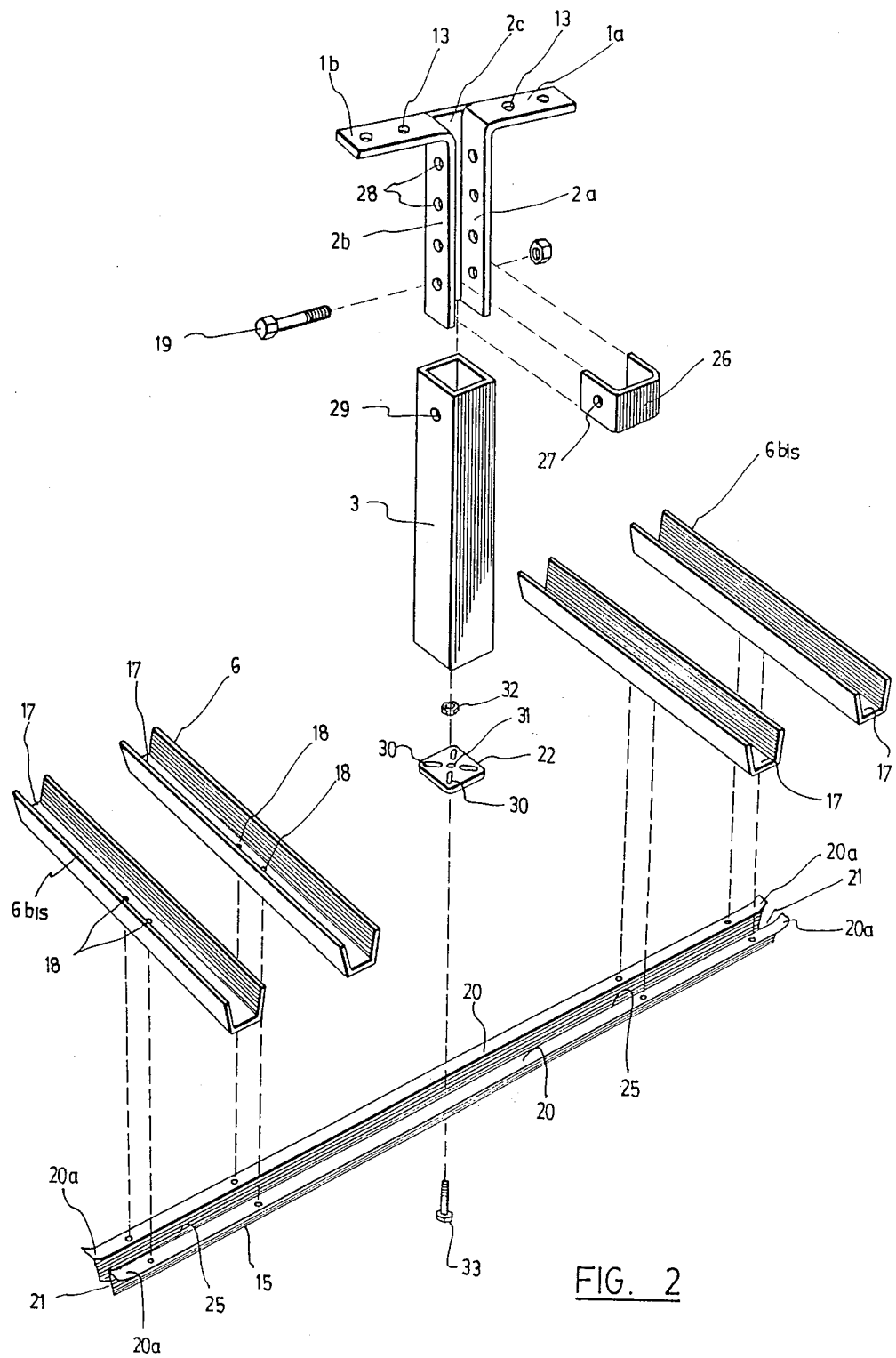
FIG. 2 shows an exploded view of a second embodiment.

Because of production and packing constraints it is most preferred to embody the invention in modular elements such as shown in FIG. 2.

Here the attachment member is again T-shaped and is made up of two right angled planar elements and a third vertical planar element (2c). The bar of the T-shaped attachment member comprises: the horizontal portions (1a and 1b) of the right angled elements which each have a ceiling attachment facility shown here as holes (13) for the passage of bolts, screws or equivalent retaining menas (not shown).

The stem of the T-shaped member is a three sided channel member (2) with parallel opposite sides (2a and 2b) forming the vertical portions of the right angled elements and continuous with the respective horizontal portions (1a and 1b). The parallel sides (2a and 2b) are perpendicular to the back side (2c).

The height adjusting member (3) which is telescopically mounted inside the stem (2) of the T-shaped member is a cross-sectionally square, hollow tube retained by securing means at the desired vertical position relative to the stem (2) by resort to a bolt (19) or equivalent which passes through holes (28 and 29) in regiser, in the stem (2) and in the height adjusting member (3) respectively.

If desired a clamp (26) may be added to strengthen the joint. This clamp also has holes (27) which register with holes (28 and 29 respectively) in the stem (2) and in the height adjusting member (3). Preferably the clamp (26) is welded in position.

The frame in this embodiment is a beam (15) which may be made up of several similarly shaped pieces (not shown) joined end to end to achieve a beam of variable length.

The support members (6) have channels of cross-sectionally flat-bottomed U-shape. These channeled support members (6) may be fashioned from sheet metal or other rigid material and may be secured to the beam (15) by bolts (18) or equivalent means normally at about the mid-point of each support member (6).

Although the frame may carry a single support member it is preferred that at least one pair of support members (6) is carried—as in FIG. 1—. However, when the frame is a beam, the beam (15) may be extended along its length in the manner described above, or may be integrally long enough, to carry a second pair of support members (6 bis) outwardly of the first pair, as shown in FIG. 2. Thus a rack having two pairs of support members is realised. It is envisaged that more than two pairs of support members may be used or that other combinations using variations in numbers of support members, in support member length and in beam length may be created.

In this embodiment of the invention (FIG. 2), the beam (15) has longitudinal lips (20) either side of a valley (25) in the beam. The lips (20) make a more rigid structure and afford economies of using thinner material.

At both ends of the beam (15) in this embodiment, there are two U-shaped cut-away portions (21) in the horizontal boottom of the valley (25). These cut-away portions (21) in conjunction with longitudinally upturned lips (20a) at the ends of the beam, provide a means for suspending inter alia a girl's bicycle from its saddle. The seat post of the bicycle thus passes through the cut away portion (21) while the saddle itself is retained by the upturned lips (20a).

As noted above, the height adjusting member (3) is a cross-sectionally square hollow the tube simlilar to that in FIG. 1 except that the lower end of the tube (3) in FIG. 2 carries a plug (22) which is welded in position. The plug (22) may contain strengthening holes (30) but in any event includes a central hole (31) into which may fit a pem fastener (32). A bolt or screw (33) may then be used to attach the base of the tube (3) to the beam (15). On attachment, the tube (3) sits in the valley (25) of the beam (15).

If two or more ceiling racks according to the invention are suitably juxtaposed, a plank may be placed between them, supported by at least two such racks, thus forming shelving.

Although the present invention has been described hereinabove by means of preferred embodiments thereof, it should be pointed out that any modification to these preferred embodiments, within the scope of the appended claims, is not deemmed to change or alter the nature of the invention.

The embodiments of the invention in which an exclusive property or privelege is claimed are defined as follows:

1. A ceiling rack comprising:
   a T-shaped attachment member comprising a horizontal bar attachable to the ceiling and a vertical stem projecting down from the bar, wherein said stem consists of a U-shaped channel member having a back side with an upper end and a pair of opposite sides that are parallel to each other and perpendicular to said back side, said opposite sides having upper ends that integrally extend away from the upper end of said back side and are horizontally angled to form together said horizontal bar;
   a height adjusting member telescopically mounted to the stem portion, said height adjusting member consisting of a hollow tube that is cross-sectionally square and has a lower end closed by a plug;
   securing means to retain the height adjusting member in one of a plurality of vertical settings provided onto the stem;
   at least one elongated, horizontal support member on either side of said T-shaped attachment member, each support member having an upwardly open longitudinal channel; and
   a frame consisting of a beam having longitudinal lipped edges extending from a valley,
   first means to removably attach said beam at mid point thereof to the plug at the lower end of the height adjusting member; and
   second means to removably attach each support member at mid point thereof to said frame at a given distance from said T-shaped attachment member.

2. A ceiling rack according to claim 1, wherein two of said support members are disposed equidistant on either side of the height adjusting member.

3. A ceiling rack according to claim 2, wherein each of said support members has a V-shaped cross-section.

4. A ceiling rack according to claim 3, wherein the angle of the V is approximately 45°.

5. A ceiling rack according to claim 2, wherein each of said support members has a flat-bottomed U-shaped cross-section.

6. A ceiling rack according to claim 1, wherein the U-shaped channel member forming said stem has interior dimensions that are just slightly larger than the corresponding exterior dimensions of said height adjusting member.

7. A ceiling rack according to claim 6, further comprising a clamp securable to the opposite sides of said U-shaped channel member forming said stem to close a portion of said U-shaped channel member to strengthen the height adjusting member in the stem.

8. A ceiling rack according to claim 1, wherein a U-shaped cut-away portion is provided in the valley of at least one end of the beam and wherein said lips are slightly upwardly raised towards said one end.

9. A ceiling rack according to claim 1, wherein the U-shaped channel member forming said stem has interior dimensions that are just slightly larger than the corresponding exterior dimensions of said height adjusting member; wherein a U-shaped cutaway portion is provided in the valley of at least one end of the beam and wherein said lips are slightly upwardly raised towards said one end; and further comprising a clamp securable to the opposite sides of said U-shaped channel member forming said stem to close a portion of said U-shaped channel member to strengthen the height adjusting member in the stem.

* * * * *